United States Patent [19]
Schouwey

[11] Patent Number: 5,178,356
[45] Date of Patent: Jan. 12, 1993

[54] MULTIPURPOSE SUPPORT ASSEMBLY FOR OUTDOOR GAMES OR SHELTER CONSTRUCTIONS

[76] Inventor: Jeannine P. Schouwey, 1 Allée Rameau, 92320 Chatillon sous Begneux, France

[21] Appl. No.: 623,713
[22] PCT Filed: Apr. 27, 1989
[86] PCT No.: PCT/FR89/00202
  § 371 Date: Dec. 14, 1990
  § 102(e) Date: Dec. 14, 1990
[87] PCT Pub. No.: WO90/12980
  PCT Pub. Date: Nov. 1, 1990
[51] Int. Cl.⁵ ............................................. F16M 13/00
[52] U.S. Cl. ................................ 248/519; 160/84.1; 160/236; 248/158; 248/910
[58] Field of Search .............. 248/158, 519, 523, 524, 248/592, 910, 542; 150/147; 160/166.1, 178.1, 84.1, 236; 40/606, 610, 611, 605, 607

[56] References Cited

U.S. PATENT DOCUMENTS

| | | | |
|---|---|---|---|
| 1,239,145 | 9/1917 | Wantz | 248/542 X |
| 2,074,482 | 3/1937 | Martens | 160/DIG. 7 X |
| 2,142,629 | 1/1939 | Clark, Jr. | 160/236 X |
| 2,718,911 | 9/1955 | Solomon | 150/147 |
| 3,119,588 | 1/1964 | Keats | 248/910 X |
| 3,794,279 | 2/1974 | Kramer | 248/529 X |
| 3,841,631 | 10/1974 | Dolan | 248/910 X |
| 4,541,190 | 9/1985 | Weiner et al. | 40/610 |
| 4,591,126 | 5/1986 | Berney | 248/524 |
| 4,647,042 | 3/1987 | Bruce | 273/26 E |
| 4,717,110 | 1/1988 | Fohrman | 40/607 X |
| 4,793,611 | 12/1988 | Thornell | 248/910 X |
| 4,800,834 | 1/1989 | Feng | 40/607 X |
| 4,916,840 | 4/1990 | Getz | 40/605 |
| 5,012,603 | 5/1991 | Elcock | 40/605 |
| 5,046,543 | 9/1991 | Levy | 160/84.1 |

FOREIGN PATENT DOCUMENTS

| | | |
|---|---|---|
| 71442404 | 11/1971 | Fed. Rep. of Germany . |
| 2136190 | 2/1973 | Fed. Rep. of Germany . |
| 3109451 | 11/1982 | Fed. Rep. of Germany . |
| 1386189 | 12/1964 | France . |
| 1527785 | 6/1968 | France . |
| 2626345 | 7/1989 | France . |
| 340433 | 9/1959 | Switzerland . |
| 391977 | 9/1965 | Switzerland ............. 248/910 |
| 922308 | 3/1963 | United Kingdom . |

Primary Examiner—Alvin C. Chin-Shue
Assistant Examiner—Derek J. Berger
Attorney, Agent, or Firm—Young & Thompson

[57] ABSTRACT

The invention relates to a support assembly to which outdoor games equipment (net, elastic or rope) and folding panels used in shelters, exhibition stands, for decorative or advertising purposes or as general notice boards, can be attached. The assembly is made up of a container (1) and a shaft (5), the container being filled with water, sand or gravel and including a handle (2) and a hole (4) through which the shaft is housed; and the shaft comprising elements nesting into each other which can be placed one on top of the other. The support assembly can be made of plastic or of a light alloy.

15 Claims, 3 Drawing Sheets

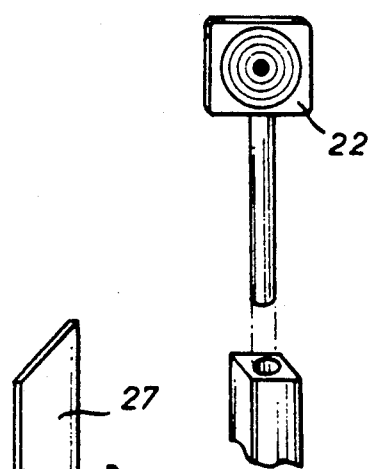
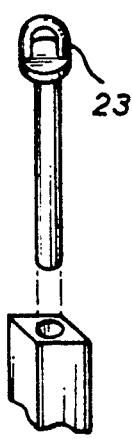
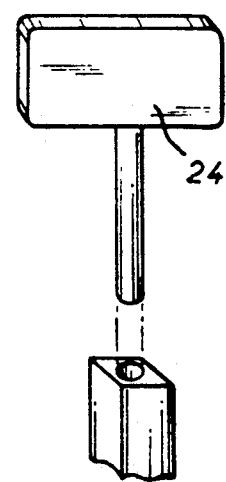
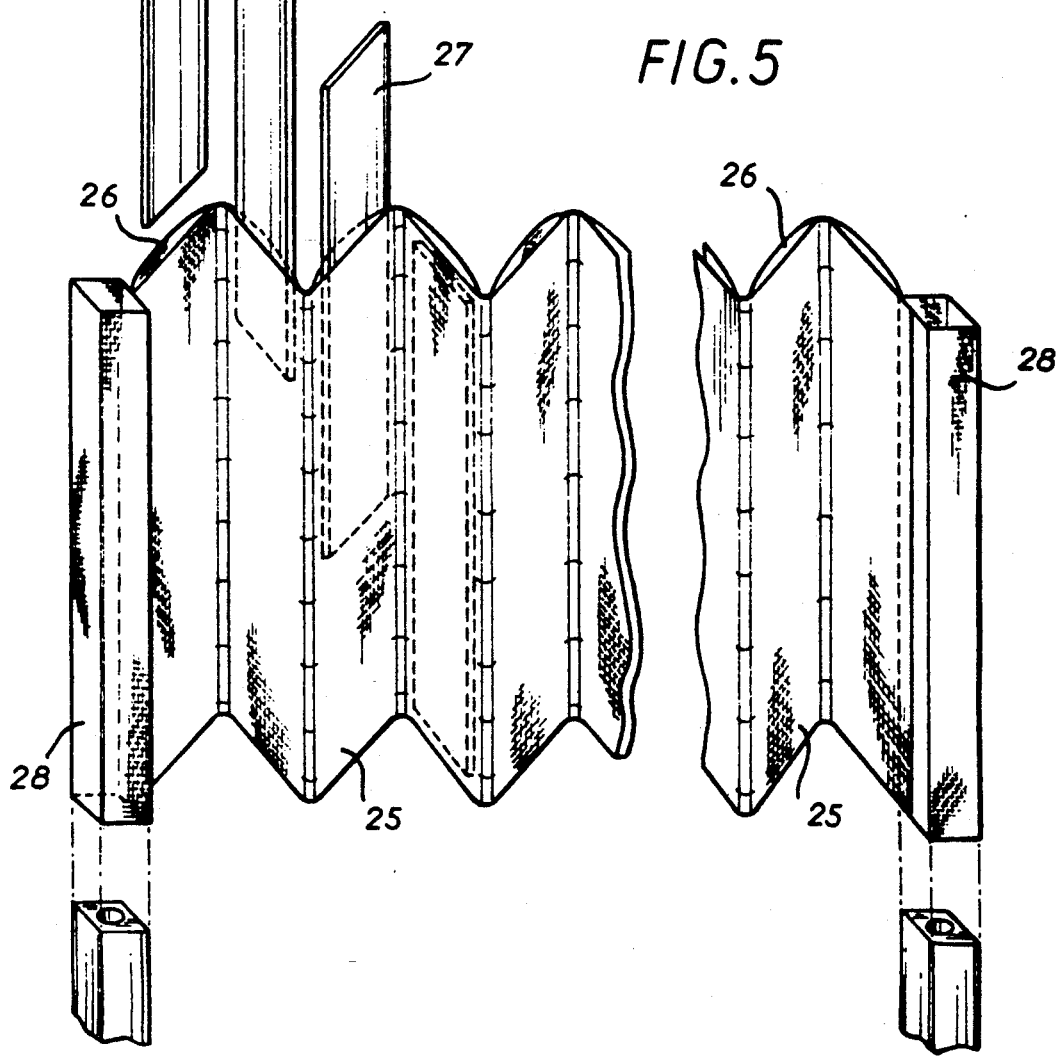

MULTIPURPOSE SUPPORT ASSEMBLY FOR OUTDOOR GAMES OR SHELTER CONSTRUCTIONS

FIELD OF THE INVENTION

This Invention concerns a multipurpose support assembly for playground equipment; miscellaneous shelter constructions (rain huts, wind-breaks, sun screens etc.); safety boundaries (particularly for monitoring recreation areas) (notably on beaches); construction of exhibition-stand partitions; safety barriers around civil engineering sites; erection of decorative panels or advertising boardings, or notice boards of any kind.

BACKGROUND OF THE INVENTION

Within the stated applications (except in cases of hard surfaces) it is common practice to employ shafts or uprights fixed into the ground; the high weight and large dimensions of such uprights do not make for easy transport; a maximum of fixed rings also are required for attaching the desired equipment (rope, elastic cord etc.), and construction of the upright itself requires further hardware (nuts and bolts).

The subject of the Invention is to provide a multipurpose support assembly obviating the above disadvantages, suitable for all types of ground, of low weight, easily transportable, adjustable, with no bolting systems, to allow rapid installation through simple stacking of the various structural elements, and rapid attachment of accessories; in sum, a system producible in various dimensions tailored for the end-user (children or adults) and of a weight tailored for the type of accessories to be supported. This device is equally designed as an instructional tool for children of even the earliest ages, in team sports as volley ball or individual sports such as high-jumping or shooting. The same device can also be employed for educational games, as, for example, by attaching signs to the said supports when teaching the Highway Code.

SUMMARY OF THE INVENTION

This Invention covers a series of superimposable parts forming a support allowing attachment of games accessories (nets, skipping ropes, elastic cord for high-jumping, pennons or flags), as well as miscellaneous panels and shelter elements.

General low weight, and the compactness of the multipurpose support and its accessories (stowed in a simple hand-carried bag) make for easy transport, even by small children.

The support consists of modules of various shapes placed on or nesting one in the other. The basic module is formed by a container which can be filled with water, sand or gravel to give the necessary weight for supporting the various games equipment, shelter elements or panels. Where required, several basic elements can be stacked to give the necessary weight to counterbalance the size and weight of the various accessories.

Each module used in the support is produced as a single injection- or blow-molded plastic part. Other lightweight high-strength materials can be used such as aluminum, giving the required features of rigidity, strength and above all, lightness to ensure implementation by children.

BRIEF DESCRIPTION OF THE DRAWINGS

FIG. 4 depicts three accessories for installation at the top of the shaft (13).

FIG. 5 illustrates a textile or plastic-film panel assembly.

DETAILED DESCRIPTION OF THE INVENTION

Figure 1A:
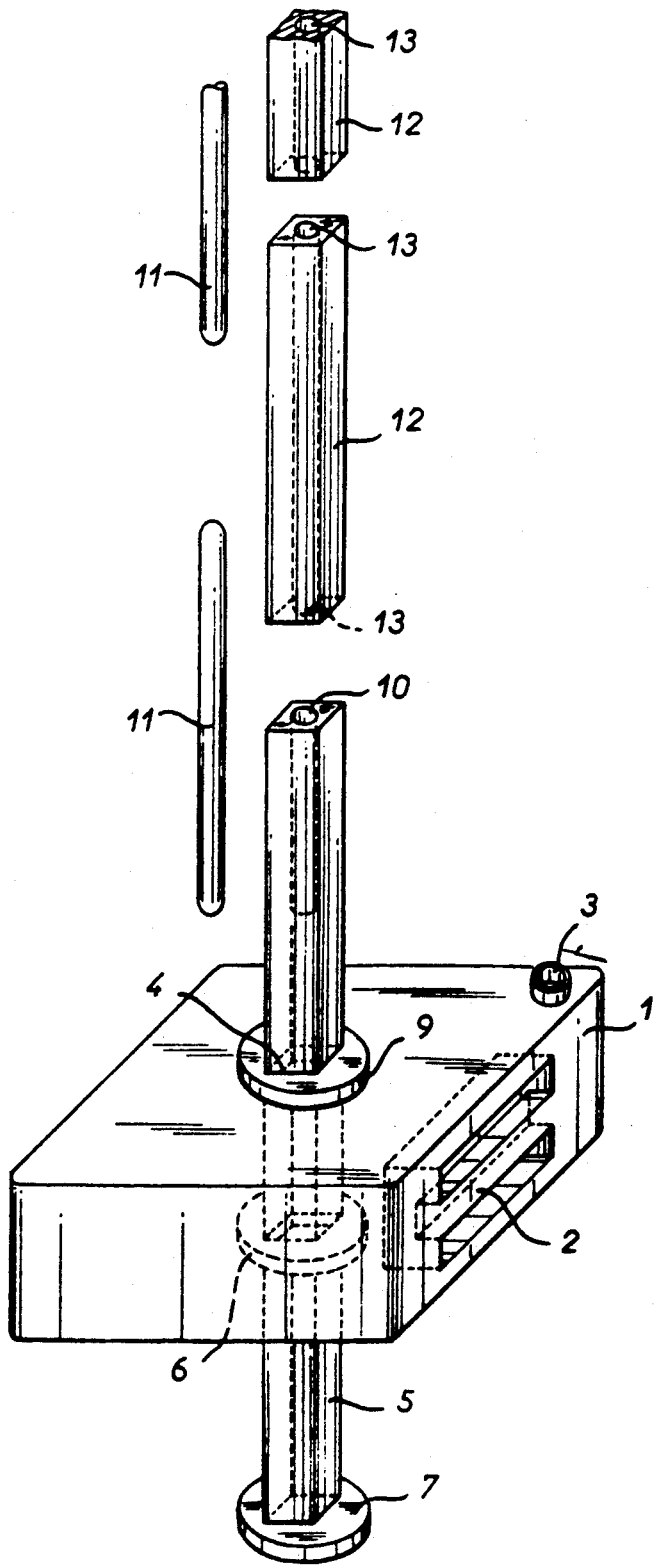
FIG. 1 is a view of a complete support assembly according to the invention.
Figure 1B:
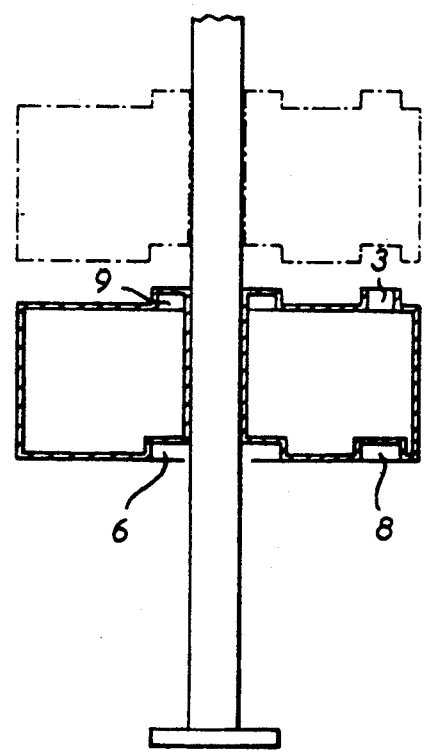

A complete support assembly is illustrated in FIG. 1:

Basic module (1) is a container whose upper part contains filler-opening (3). The container is penetrated vertically by sleeve (4) which receives module (5), onto which the container is seated. Housing (6) in the container bottom receives shoulder (7) mounted on the end of module (5). The container bottom also has housing (8) dimensioned to receive filler-opening (3), hence allowing stacking of several containers (9).

One side contains handle (2) formed by a housing above and below a central part left integral with the container side.

Module (5) forms the first element of the shaft (or "prop") and is fitted with boss (7) which houses in container (1). The other end contains bore (10) which has sufficient depth to receive rod (11), which is strong enough to form a sound interface with another module (12).

Module (12) is another part of the prop, penetrated by bore (13) which has sufficient depth to receive rod (11), which is strong enough to form a sound interface with other modules (13). Depending on the application (games etc.), the length of this module can be varied.

Figure 2:
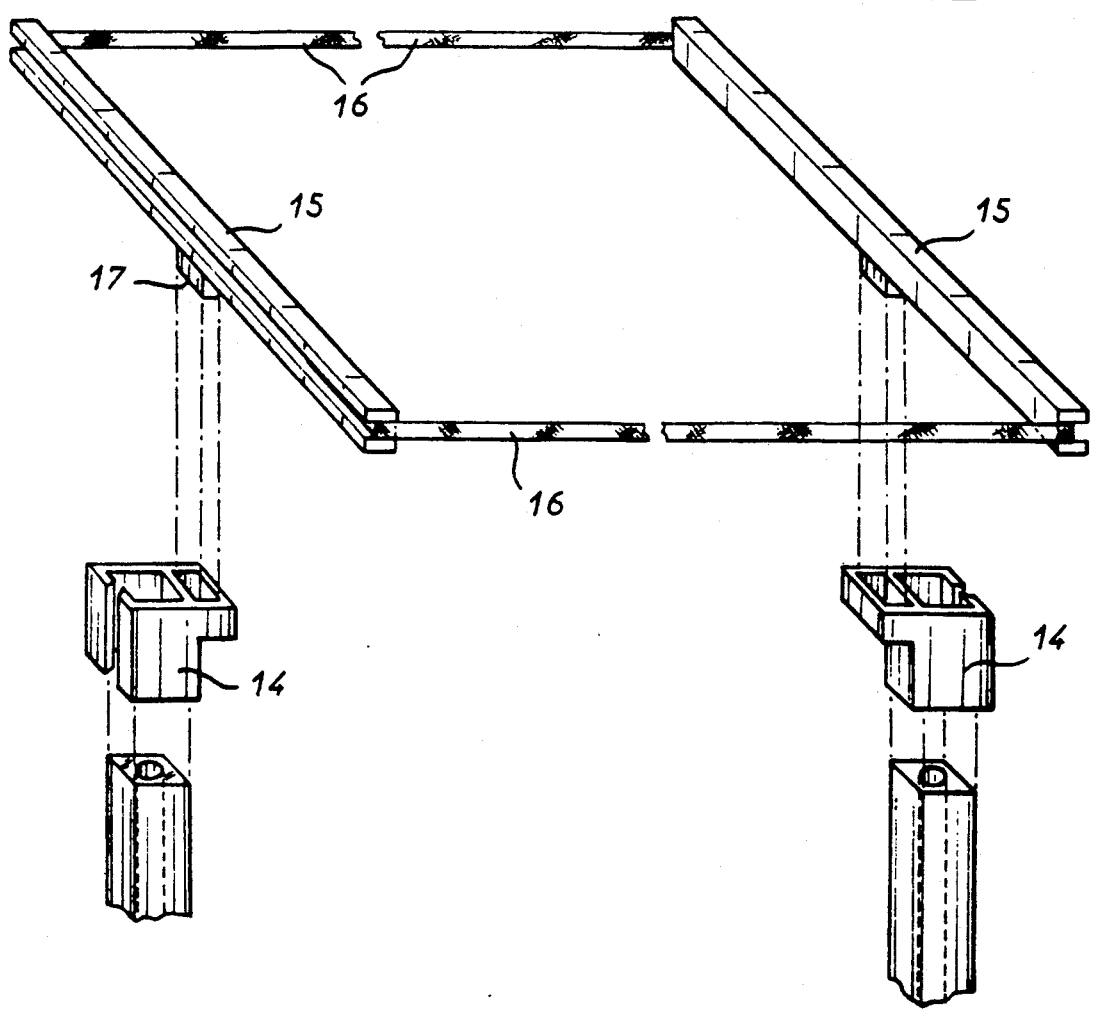
FIG. 2 depicts an accessory designed for the "elastic skipping" game.

FIG. 2 represents an accessory designed for the "elastic skipping" game and comprising three parts: sliding part (14) (two off), crossbar (15) (two off), and elastic cord (16). Slide (14) is split down one face to form a two-part "clip" allowing upward and downward movement (height adjustment) along the prop. The side opposide the split side has a shoulder containing an opening into which another part (crossbar stem) is fitted, to receive stub (17) on the crossbar.

Crossbar (15) is designed to space the two parts of elastic (16); the elastic fits in a groove along one side of the crossbar. Hence this accessory enables a lone child to play the elastic game, whereas three children are normally involved (two using their legs to hold the elastic apart).

Slide (14) also can be used for height-marking when used with graduated shafts.

Figure 3A:
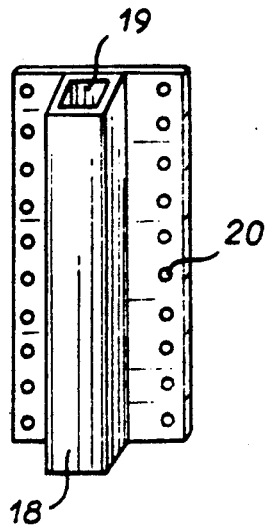
FIG. 3 depicts an accessory designed for high jumping.
Figure 3B:
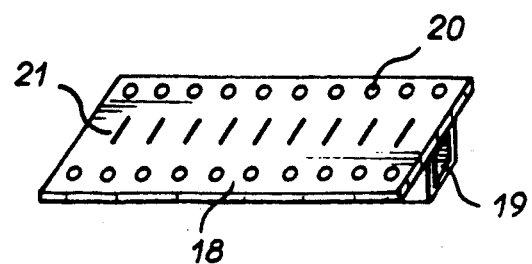

FIG. 3 represents an accessory designed for high-jumping and consisting of a flat scale (18) with sleeve (19) fixed along one side. The part fits over support mast (12). This part is perforated (20) at one-centimeter centers along each long side, hence forming the graduations and a position mark for the elastic, which is attached to the scale at the selected hole. A number (21) is scribed alongside each hole.

FIG. 4 illustrates three accessories for installation at the top of shaft (13):

1st accessory (22) is a rod topped by a target;

2nd accessory (23) is a rigid bar topped by a ring for attaching a chain or skipping rope via a swivel;

3rd accessory (24) is a rod topped by a notice or sign board.

FIG. 5 illustrates a textile or plastic-film panel (25) (two thickness of heat-welded material forming pockets (26) between the two sides); the pockets receive lathes (27) providing rigidity while allowing the assembly to be folded fan-wise. Two side pockets or tunnels (28) are slid over the shafts, to extend the panel.

The device covered by the Invention has applications in the field of leisure, safety, decoration, communication and teaching.

I claim:

1. Multipurpose support assembly for open-air games or transportable structure suitable for all types of ground and for use by young children, the support assembly comprising a lightweight hollow container base having a filling opening for introducing ballast thereinto, a closure device for closing the filling opening, the container having generally parallel upper and lower surfaces, the container defining a passageway extending between upper and lower surfaces, and a support mast having an enlarged flange at one end thereof, said mast having a cross section suitable for insertion into the passageway in said container base, a recess complementary to the enlarged flange being disposed on the lower surface of the container base around the passageway for accommodating the enlarged flange when the shaft is assembled with the container base, the lower surface of the container base being in bearing contact with the ground when the support assembly is in position on the ground.

2. Support assembly according to claim 1, wherein the closure device protrudes above the upper surface, a corresponding recess being formed in the lower surface of the container base, so that the closure device of a said container base can be received in the recess of a superjacent container base.

3. Support assembly according to claim 2, wherein said container base is generally parallelepipedic.

4. Support assembly according to claim 2, wherein the container base has a carrier handle recessed in a surface thereof.

5. Support assembly according to claim 4, wherein said container base is generally parallelepipedic, and said recess carrier handle is recessed in a side surface between said upper and lower surfaces.

6. Support assembly according to claim 2, further including a plurality of said container bases, each of said container bases being of identical configuration.

7. Support assembly according to claim 2, further including a folding panel accessory having an upper mast section at each end, each end adapted to be supported by said support mast, a plurality of substantially parallel panel sections and fold lines being defined between adjacent panels.

8. Support assembly according to claim 7, wherein each of the folding panel sections comprises a vertical pocket, a slat removably accommodatable in each of the pockets.

9. Support assembly according to claim 1, wherein said support mast has a bore at an end remote from said enlarged flange, said support assembly further including at least one upper mast section having substantially the same cross section as the support mast and a bore at an end thereof, a pin cooperable with the bore for assembling said at least one upper mast section to said support mast or to another upper mast section.

10. Support assembly according to claim 9, further including a plurality of said upper mast sections, each of said upper mast sections having a bore at either end, and a pin for cooperating with the bores of respective superposed upper mast sections.

11. Support assembly according to claim 9, further including a graduated scale accessory having a series of perforations for securing an elastic at one end, said graduated scale accessory having a sleeve adapted to be selectively received on said support mast and the upper mast section adapted to be fixed to said support mast.

12. Support assembly according to claim 9, further including an accessory having a pin adapted to be selectively inserted into said bore of said support mast or the upper mast section adapted to be fixed to said support mast.

13. Support assembly according to claim 12, wherein said accessory is selected from the group consisting of a target, a ring and a notice board.

14. Support assembly according to claim 1, further including a protuberance on the upper surface of the container base complementary to the recess on the lower surface of the container base whereby two or more such container bases can be stacked on one another in a stable supporting relationship.

15. Multipurpose support assembly for open-air games or transportable structure suitable for use by young children, the support assembly comprising a pair of light-weight hollow container bases, each of the container bases having a filling opening for introducing ballast thereinto and a closure device for closing the filling opening, each of the container bases also having generally parallel upper and lower surfaces and defining a passageway extending between upper and lower surfaces, and a corresponding pair of support masts, each of the support masts having an enlarged flange at one end thereof, each said mast having a cross section suitable for insertion into the passageway in the corresponding container base, a recess complementary to the enlarged flange being disposed on the lower surface of the container bases around the passageway for accommodating the enlarged flange when the shaft is assembled with the corresponding container base, a pair of auxiliary support members, each having a support mast receiving portion complementary with an outer section of the corresponding support mast, each of said auxiliary support members being adjustably mountable at a desired height along the corresponding support mast, each of said auxiliary support members having a cavity for receiving a crossbar, an elastic extending between the ends of the respective crossbars.

* * * * *